(12) United States Patent
Skvorecz

(10) Patent No.: US 9,517,858 B2
(45) Date of Patent: *Dec. 13, 2016

(54) COMPACTLY STACKABLE WIRE CHAFING STAND

(71) Applicant: Robert J Skvorecz, Kinnelon, NJ (US)

(72) Inventor: Robert J Skvorecz, Kinnelon, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/665,498

(22) Filed: Mar. 23, 2015

(65) Prior Publication Data

US 2016/0280417 A1    Sep. 29, 2016

(51) Int. Cl.
| | |
|---|---|
| A47G 23/02 | (2006.01) |
| B65D 6/08 | (2006.01) |
| B65D 21/02 | (2006.01) |
| A47B 87/02 | (2006.01) |
| A47J 36/34 | (2006.01) |

(52) U.S. Cl.
CPC ............. *B65D 7/20* (2013.01); *A47B 87/0207* (2013.01); *A47J 36/34* (2013.01); *B65D 21/0233* (2013.01)

(58) Field of Classification Search
CPC ..... B65D 7/20; B65D 21/0233; B65D 21/046; A47J 36/34; A47B 87/0207
USPC ... 248/153, 175; 211/181.1; 220/315, 513.1, 220/743, 756; 126/40; 99/449
See application file for complete search history.

(56) References Cited

U.S. PATENT DOCUMENTS

| | | |
|---|---|---|
| 215,180 A | 5/1879 | Stiles |
| 983,473 A | 2/1911 | Barnes |
| 1,386,878 A * | 8/1921 | Lamp ............... B65D 21/0224 206/503 |
| 1,485,852 A | 3/1924 | Jarvis |
| 1,688,846 A | 10/1928 | Andrews |
| 1,947,932 A | 2/1934 | Fante |
| 2,007,997 A | 7/1935 | Abermethy |
| 2,110,726 A | 3/1938 | Harvey |
| 2,190,065 A | 2/1940 | Griffin |
| 2,269,425 A | 1/1942 | Bitney |
| 2,673,053 A | 3/1954 | Kilian |
| 2,739,466 A | 3/1956 | Maliniak |
| D181,149 S | 10/1957 | Hoffstein |
| 2,837,624 A | 6/1958 | Katzman et al. |
| 2,838,198 A | 6/1958 | Vidal |
| D189,469 S | 12/1960 | Fischer |
| 2,979,242 A | 4/1961 | Van Huis et al. |
| 3,160,308 A | 12/1964 | Hare et al. |
| 3,276,733 A | 10/1966 | Rosser |
| 3,305,125 A | 2/1967 | Chesley |
| D213,899 S | 4/1969 | Rickmeier, Jr. |
| 3,650,384 A | 3/1972 | Pegg |

(Continued)

*Primary Examiner* — Anita M King

(74) *Attorney, Agent, or Firm* — Michael J. Feigin, Esq.; Feigin & Fridman

(57) ABSTRACT

A chafer wire stand has an upper rim of a closed rectangle and a lower rim of wire metal of similar, but smaller shape. The chafer stand is nestable such that straight wire section extending between the upper and lower rim touch each other when nested and the upper rims of the nested stands are held close to each other. The upper and lower rims are connected by at least two wires substantially identically shaped and bent with each wire being unitary and having a segment thereof attached to the upper rim and extending outwardly therefrom to form a handle element for the chafer wire stand. Each wire is attached to the lower rim and extends therefrom to form two supporting legs for the chafer wire stand.

13 Claims, 10 Drawing Sheets

(56) References Cited

U.S. PATENT DOCUMENTS

| | | | | |
|---|---|---|---|---|
| 3,848,748 | A | 11/1974 | Ceccarelli | |
| 3,939,980 | A | 2/1976 | King | |
| 3,939,981 | A | 2/1976 | King | |
| 4,025,013 | A | 5/1977 | Anantharaman | |
| 4,079,836 | A | 3/1978 | Von Stein et al. | |
| 4,135,691 | A | 1/1979 | Wiesmann | |
| 4,557,200 | A | 12/1985 | Geschwender | |
| 4,718,402 | A | 1/1988 | Fordyce | |
| 4,805,785 | A * | 2/1989 | Pfeifer | A47B 87/0207 211/181.1 |
| 4,899,722 | A | 2/1990 | Horewitch | |
| 4,920,873 | A | 5/1990 | Stevens | |
| 5,065,735 | A | 11/1991 | Bourgeois et al. | |
| 5,074,223 | A * | 12/1991 | Remmers | A47B 87/0207 108/125 |
| 5,152,407 | A * | 10/1992 | Massoudnia | A47B 87/0207 211/126.15 |
| 5,282,458 | A | 2/1994 | Trimble | |
| 5,287,800 | A | 2/1994 | Orednick | |
| 5,301,909 | A | 4/1994 | Chang | |
| 5,503,062 | A | 4/1996 | Buff, IV | |
| 5,819,640 | A | 10/1998 | Cuomo | |
| D406,984 | S | 3/1999 | Skvorecz | |
| 5,921,513 | A | 7/1999 | Skvorecz | |
| 5,996,948 | A | 12/1999 | Skvorecz | |
| 6,047,932 | A | 4/2000 | Skvorecz | |
| 6,065,629 | A | 5/2000 | Sarnoff et al. | |
| 6,170,405 | B1 | 1/2001 | Weitzman et al. | |
| 6,213,005 | B1 | 4/2001 | Sherman | |
| 6,234,068 | B1 | 5/2001 | Sherman | |
| 6,520,354 | B1 | 2/2003 | Skvorecz | |
| D485,706 | S | 1/2004 | O'Connell Cooper et al. | |
| 7,954,772 | B2 * | 6/2011 | Skvorecz | A47J 36/34 126/40 |
| 7,967,155 | B2 * | 6/2011 | Klingspor | F24C 15/16 108/91 |
| 9,414,712 | B2 * | 8/2016 | Skvorecz | A47J 36/2405 |
| 2013/0313211 | A1 * | 11/2013 | Skvorecz | B65D 7/20 211/85.31 |
| 2016/0128509 | A1 * | 5/2016 | Skvorecz | A47J 36/2405 248/153 |

\* cited by examiner

COMPACTLY STACKABLE WIRE CHAFING STAND

FIELD OF THE DISCLOSED TECHNOLOGY

This invention relates to an economical, easily constructible wire chafing stand which is also very compactly nestable and stackable for compact storage and maximized stability.

BACKGROUND OF THE DISCLOSED TECHNOLOGY

Chafers and chaffing stands are used to hold pans, often with a heating device held below the pan. Catering establishments and restaurants often use such devices when keeping food warm at a location other than where the food was initially prepared. For example, chafers are used in places such as banquet halls and the like, where large amounts of food are constantly being directly served.

The chafers, usually in the form of rectangular metal receptacles, are of a normally standard dimensional size and are filled with food to be heated and/or served. Chafers are commonly supported upon transportable wire stands during both heating and serving, with each of the wire stands being hereinafter referred to as a "wire chafing stand" and usually being composed of steel. The wire chafing stand of the prior art, as exemplified by U.S. Pat. No. 5,921,513, issued to Robert Skvorecz, is a relatively simple structure having an upper rim and a lower rim formed of respective larger and smaller rectangular wire structures around a respective rectangular opening. The upper and lower rim are connected to each other by means of wire legs to form a frusto-pyramidical structure dimensioned to hold and support a chafer with contained food. The wire legs are usually welded to the upper and lower rims at the corners of the structure with the wire legs extending below the lower rim so that they also function as bottom supports to keep the stand level with the ground and to maintain the lower rim at a predetermined height above ground level for placement of chafing fuel heaters for the chafing dish in the stand.

Because numerous chafers are used at occasions, where required, numerous wire chafing stands are also required, with both the chafers and the wire chafing stands being respectively transported and stored and nested together in multiple units. Presently, wire chafing stands, such as those shown and described in the aforementioned patent, permit the stands to be partially nested into one another when stacked i.e., the stands nest, however only to a limited extent. As further described in said patent, the cost of storage and transportation has a direct relationship to the vertical height of a stack of nested wire stands. Accordingly, for wire stands with only limited nesting capability, the transportation cost for transporting such wire stands over long distances becomes a significant factor in its selling price. This, in turn, reduces the ability to compete over large geographical areas where transportation cost and/or storage cost become too large.

In describing the wire stand structure of a chafer in the prior art patent, it was further noted therein that structures which permit nesting of multiple stands to reduce the vertical column height of a stack of nested stands, almost invariably entailed numerous shortcomings. These shortcoming include complicated wire stand designs which otherwise increase the cost of fabrication and cause the stand to be unwieldy, structurally as well as esthetically.

One particular problem in the art is the difficulty in removal of wire stands from one another after nesting. Generally, if the wire stands are tightly nested they tend to wedge into one another and are then difficult to separate. The chafing stands must be readily separable from one another, thereby specifically excluding deep nesting from normal considerations of chafer wire stand construction.

There is therefore a need in the art to provide a wire chafing stand which has improved nesting ability, a decreased storage footprint, and which is simpler to manufacture and less expensive to procure.

SUMMARY OF THE DISCLOSED TECHNOLOGY

The present application is directed towards a wire stand for a chafer, or wire chafing stand, which enables deep nesting of multiple stands to minimize the size of stacked stands. This permits a stacked height of a plurality of such stands to be significantly smaller than that of the prior art without having the problems of complicated and expensive structure mentioned in the prior art.

There is thus provided in accordance with an embodiment of the teachings herein a chafer wire stand including a) an upper rim of wire metal which forms a closed geometrical configuration circumscribing a first surface area, b) a lower rim of wire metal having a geometric shape substantially identical to the upper rim and circumscribing a second surface, the second surface area being smaller than the first surface area, and c) at least two wires of wire metal substantially identically shaped and bent, such that: each of the at least two wires has a segment thereof attached to the upper rim and extending outwardly therefrom to form a handle element for the chafer wire stand; and each of the at least two wires being attached to the lower rim and extending downwardly therefrom to form at least one supporting leg for the chafer wire stand; wherein each of the at least two wires has at least two straight wire segments thereof extending at an angle between the upper rim and lower rim and connected thereto respectively to thereby hold the upper and lower rim in fixed position relative to each other and wherein each wire is substantially symmetrical relative to a vertical axis through a center thereof.

In some embodiments, there are provided at least two chafer wire stands as disclosed herein such that a first chafer wire stand is nested on top of a second chafer wire stand and at least four respective the segments of the first chafer stand touch at least four corresponding the segments of the second chafer stand in the nested condition.

In some embodiments, the segment of the wire attached to the upper rim to form the handle element is attached to the bottom of the upper rim.

In some embodiments, the at least one supporting leg is bent outwardly and extends out of a plane beyond the second surface area of the lower rim.

In some embodiments, the upper rim and lower rim are each of substantially rectangular configuration having respective short end sides and long end sides, each wire includes at least one straight segment which is attached to and extends between vertically adjacent long end sides of the upper and lower rims, and each wire includes two straight segments which are attached to and extend between vertically adjacent short end sides of the upper and lower rims.

In some embodiments, nesting of multiple chafer wire stands is without wedging between adjacently nested segments.

In some embodiments, the lower rim has four corners, each wire has two ends, both ends of each wire being attached to the upper rim on opposite long end sides thereof respectively, both ends of the wire having a straight wire segment extending therefrom at an obtuse angle towards a vertically adjacent long end side of the lower rim and being attached thereto at respective positions of the lower rim adjacent to and before a proximal adjacent corner, each of the wire end extensions further extending downwardly beyond the proximal corner and being bent and shaped to form respective lower leg support at the adjacent corner, respective upwardly bent segments of the wire end extensions being attached to the lower rim at positions beyond the adjacent corner on the short end side of the lower rim, the wire ends extensions extending upwardly thereafter to form the straight segments extending between short end sides of the upper and lower rims, the respective straight segments being attached to the short end side of the upper rim on symmetrically opposite proximal sides relative to the vertical axis, and the wire end extensions extend laterally outwardly beyond the upper rim and meet as a unitary wire at the vertical axis with the formation of the handle.

In some embodiments, each wire includes fourteen twists and bends with seven twists and bends symmetrically configured on each side of the vertical axis, with the seven twists and bends including: i) a first twist proximate to an end of the wire to facilitate attachment of the wire end to the upper rim at a long end side thereof; ii) a second bend at a first point of attachment to the lower rim at a long end side thereof; iii) third and fourth bends to configure a base of a leg support; iv) a fifth bend at an upward point of attachment of the leg support to the lower rim at a short end side thereof; v) a sixth bend at a point of attachment to the upper rim at a short end side thereof to form an outwardly extending handle element; and vi) a seventh bend as part of the handle element on one side of the vertical axis.

In accordance with some embodiments of the teachings herein there is also provided a chafer wire stand including: i. an upper rim of wire metal which forms a geometrical configuration circumscribing a first surface area, ii. a lower rim of wire metal having a substantially identical geometrical configuration relative to the upper rim and circumscribing a second area, the second area being smaller than the first area, and iii. at least two wires of wire metal substantially identically shaped and bent, such that: each wire has a segment thereof attached to the upper rim and extending outwardly therefrom to form a handle element for the chafer wire stand; each wire is attached to the lower rim and extending downwardly therefrom to form at least one supporting leg for the chafer wire stand; each wire is unitary and has two ends; each wire is shaped and configured to be attached in pairs thereof to opposite sides of the vertically adjacent upper and lower rims; each unitary wire is mirror-image symmetrically bent on opposite sides of a perpendicular vertical axis extending through a center of the unitary elongated wire in a horizontal position extending along a longitudinal length thereof; the wire is symmetrically bent in multiple places along the longitudinal length thereof, with only obtuse angles of no less than 90°, on opposite sides of the vertical axis to successively form, starting from one end: a) a short lateral twist attached to a first end side of the upper rim, b) a first downwardly extending straight wire section angled towards a proximal vertically adjacent corner of the lower rim, and attaching at an end thereof to the lower rim, c) a continued off set angular bend out of a plane of the wire providing a first side of a first supporting leg, d) a bend lateral to the first side of the first supporting leg providing a supporting base for the first supporting leg, e) an upward bend defining a wire segment extending towards a distal side of the vertically adjacent corner for attachment between an end of the wire segment and the lower rim providing a second side of the first supporting leg, f) a bend providing a first straight wire section angled in a direction away from the corner of the lower rim toward a second end side of the upper rim and attached thereto, g) a lateral outward bend from the attachment of paragraph f forming a first leg of a handle element, and h) a bend parallel to the second end side of the upper rim and forming a first half of a gripping part of the handle at the vertical axis and a midpoint and half of the elongated wire, wherein the symmetrical mirror image formation of another half of the wire provides, successively: a second half of the handle, a second second-end side angled straight wire section, a second supporting leg and a second first-end side angled straight wire section.

In some embodiments, the segment of the wire attached to the upper rim to form the handle element is attached to a bottom of the upper rim.

In some embodiments, the at least one supporting leg is bent outwardly and extends out of a plane beyond the second surface area of the lower rim.

In some embodiments, the first and second downwardly extending straight wire sections, the first and second supporting legs, and the first and second angled section of successively vertically stacked chafer wire stands are configured to respectively fit adjacent each other without wedging therebetween.

Also provided is a nested stack of at least two chafer wire stands as disclosed herein, wherein the wire stands nest with respective adjacent positioning of the angled segments. Further, the straight segments may be angled such that the segments of a first the chafer stand in the nested stack and a second the chafer stand in the nested stack touch each other when nested. In some such embodiments, the supporting legs are bent outwardly out of a plane of the lower rim at an angle matched to that of the straight segments when nested.

There is further provided in accordance with an embodiment of the teachings herein a shaped and configured structurally rigid but bendable unitary elongated wire of wire metal having two ends, the wire being shaped and configured to be attached in pairs thereof to opposite sides of vertically stacked upper and lower rectangular rims of a chafer wire stand, each unitary wire is mirror-image symmetrically bent on opposite sides of a perpendicular vertical axis extending through a center of the unitary elongated wire in a horizontal position extending along a longitudinal length thereof, the unitary elongated wire is symmetrically bent in multiple places along the longitudinal length thereof, with only obtuse angles of no less than 90°, on opposite sides of the vertical axis to successively form, starting from one end: a. a short lateral twist configured for attachment thereof to a first end side of the upper rim, b. a first downwardly extending straight wire section angled towards a proximal vertically adjacent corner of the lower rectangular rim and attached at an end thereof to the lower rectangular rim, c. a continued off set angular bend out of the plane of the wire to provide a first side of a first supporting leg, d. a bend lateral to the first side of the first supporting leg to provide a supporting base for the first supporting leg, e. an upward bend defining a wire segment extending towards a distal side of the vertically adjacent corner for attachment between an end of the wire segment and the lower rectangular rim to provide a second side of the first supporting leg, f. a bend to provide a first straight wire section angled in a direction away from the corner of the lower rim toward a second end side of the upper rectangular rim configured to be attached thereto, g. a lateral outward bend from the configured attachment of paragraph f to form a first leg of a handle element, and h. a bend configured to be parallel to the second end side of the upper rim to form a first half of a gripping part of the handle at the vertical axis and a midpoint and half of the elongated wire, wherein the symmetrical mirror image formation of another half of the wire provides, successively: a second half of the handle, a second second-end side angled straight wire section, a second supporting leg and a second first-end side angled straight wire section.

In some embodiments, the first and second first-end side straight wire sections, the first and second supporting legs, and the first and second second-end side straight wire sections of successively vertically stacked shaped and configured wires are configured to respectively closely fit adjacent each other without wedging therebetween. "Closely" is defined as "within 5 mm."

The term "wedging" is defined as "two objects fixed into position requiring force in a measurable amount at least 10% greater than moving either object separately, excluding gravitational force acting on the object(s)."

The term "substantially" is defined as "considered to be so by one having ordinary skill in the art of chafer wire stands" and/or "at least 90% of the term being modified by 'substantially.'"

The term "generally" used herein is defined as a majority of the modified and described term following the word "generally."

The terms "or" and "and/or" should be interpreted as being inclusive of one or both terms being joined thereby. For example, in the set {A, B}, the phrase "A or B" includes "A," "B," and "A and B."

DETAILED DESCRIPTION OF EMBODIMENTS OF THE DISCLOSED TECHNOLOGY

Figure 1:
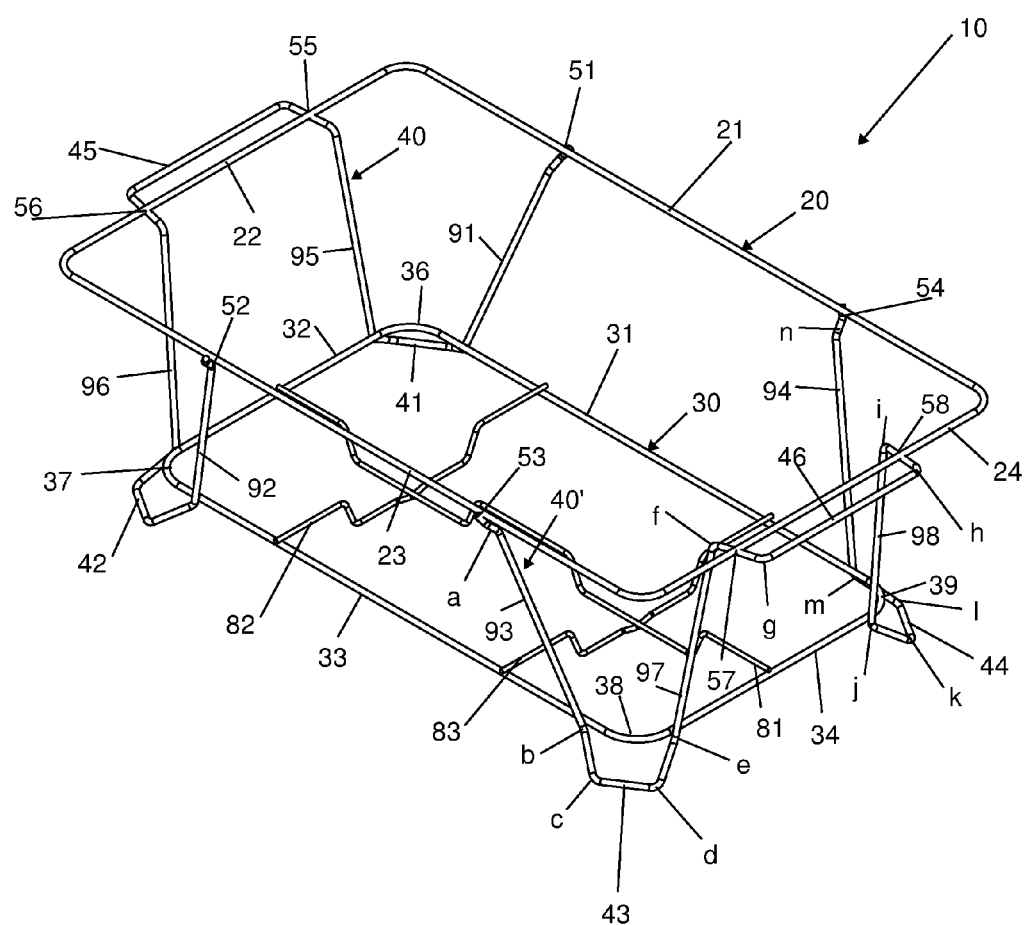
FIG. 1 is a top right side perspective view of the wire chafer stand herein.
Figure 2:
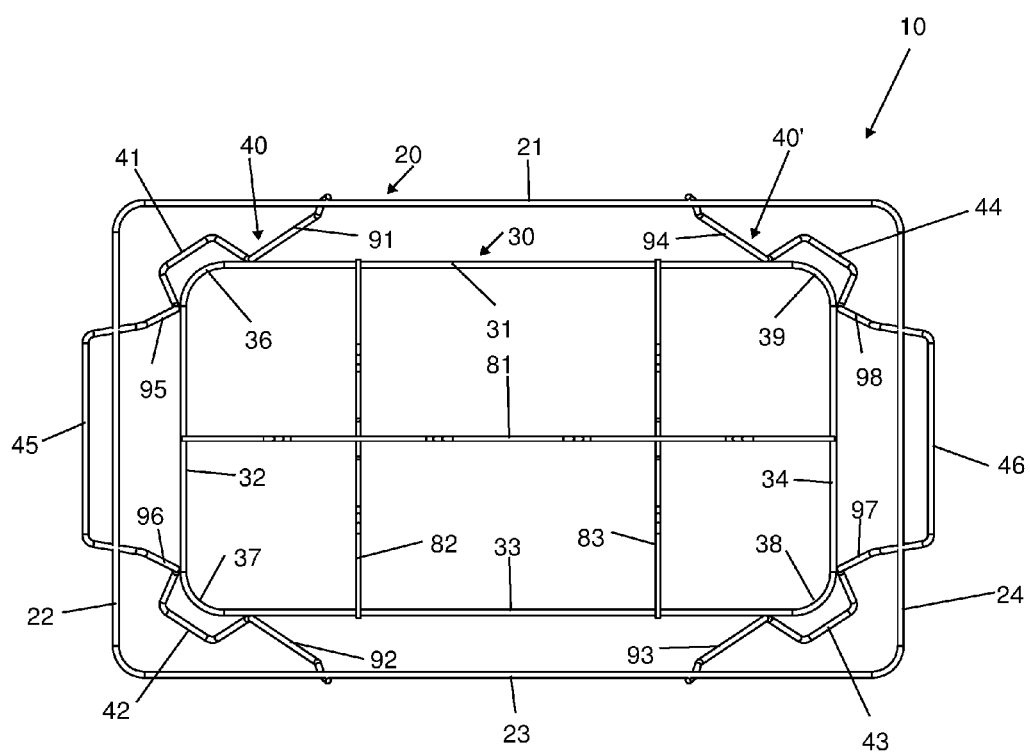
FIG. 2 is a top view of the chafer wire stand of FIG. 1.

The present application is directed towards a wire stand for a chafer, or wire chafing stand, which enables deep nesting of multiple stands to minimize the size of stacked stands.

With specific reference to the drawings, FIGS. 1-4 show a single chafer wire stand 10 of an embodiment herein, including an upper wire rim 20 and a smaller, lower wire rim 30 spaced apart and positioned relative to each in a standard chafer holding position. Upper and lower wire rims 20 and 30 form a closed substantially rectangular configuration, and have substantially identical rectangular geometry (length to width ratio) in different sizes.

Upper wire rim 20 includes a pair of long end sides 21 and 23, and a pair of short end sides 22 and 24. Similarly, lower wire rim 30 includes a pair of long end sides 31 and 33 disposed generally below long end sides 21 and 23, and a pair of short end sides 32 and 34 disposed general below short end sides 22 and 24. Lower rectangular wire rim 30 additionally includes a longitudinal segment 81 connecting short sides 32 and 34, and a pair of lateral segments 82, 83 connecting long sides 31 and 33. In some embodiments, segments 81, 83 are symmetrically spaced relative to short sides 32 and 34, each disposed approximately a quarter of the length of long sides 31, 33 away from a corresponding short side 32, 34. In some embodiments, longitudinal segment 81 includes a pair of lowered segments disposed below a plane of lower rim 30, each lowered segment received in a corresponding lowered segment formed in one of second segments 82, 83, thereby to define a pair of heating member seats in the bottom portion of chafer stand 10.

Identically dimensioned and shaped bent unitary wires 40 and 40' are attached to the short end side pairs 22, 32 and 24, 34 of the rectangular upper and lower rims 20 and 30, respectively, and form respective handles 45 and 46 supporting leg pairs 41, 42 and 43, 44 as described hereinbelow. Segment pairs 91, 92 and 93, 94 of wires 40 and 40' are straight segments which are attached to long sides 21, 23 of upper wire rim 20 at bends 51, 52 and 53, 54, respectively, and to long sides 31, 33 of lower wire rim 30, respectively, whereby they separate and hold upper and lower rims 20 and 30 in fixed position relative to each other with their respective long sides.

Straight wire segment pairs 95, 96 and 97, 98 of wires 40 and 40' are attached to short end sides 22, 24 of upper wire rim 20 at points 55, 56 and 57, 58, respectively, and to short end sides 32, 34 of lower wire rim 30, respectively, whereby they separate and hold upper and lower rims 20 and 30 in fixed position relative to each other with their respective short end sides. Thus, each of wires 40 and 40' has four segments thereof extending between the upper rim 20 and the lower rim 30 and connected thereto to thereby hold the upper and lower rims in fixed position relative to each other.

Bent wire segments 45 and 46, defined between respective wire pairs 95, 96 and 97, 98 of wires 40 and 40' are attached to the short end sides 22 and 24 of upper rim 20 respectively, and extend away from sides 22 and 24 at right angles thereto to form lifting handles 45 and 46 for the chafer wire stand 10. In some embodiments the handles 45 and 46 are welded to the lower side of short end sides 22, 24.

Bent wire segment pairs 41, 42 and 43, 44 defining the supporting legs extend below lower rim 30 at lower rim corners 36, 37 and 38, 39, respectively, and are outwardly bent, as shown, to form respective supporting legs. It is appreciated that in the illustrated embodiment the supporting legs form a quadrilateral shape which, but a triangular shape is also possible if the wire is able to accommodate bending stress which eliminates one of the bends.

Figure 3:
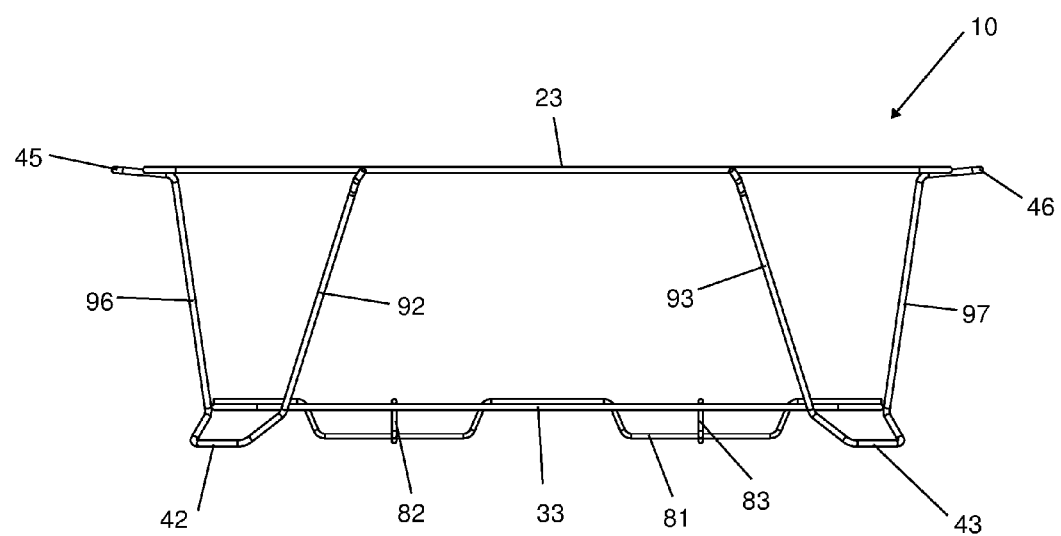
FIG. 3 is a long side view of the rectangular shaped chafer wire stand of FIG. 1 with views of both sides being identical.
Figure 4:
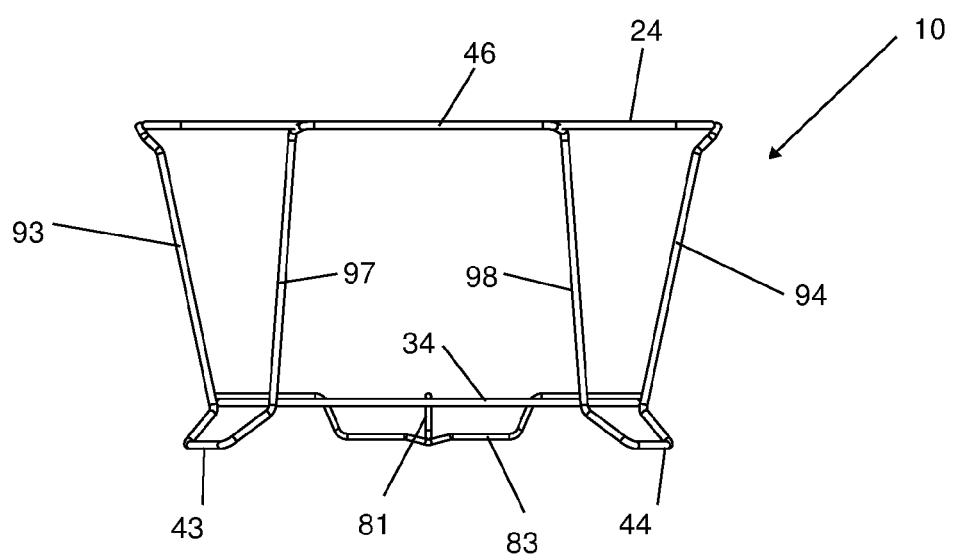
FIG. 4 is a short side end view of the rectangular shaped chafer wire stand of FIG. 1 with views of both short side end views being identical.
Figure 6:
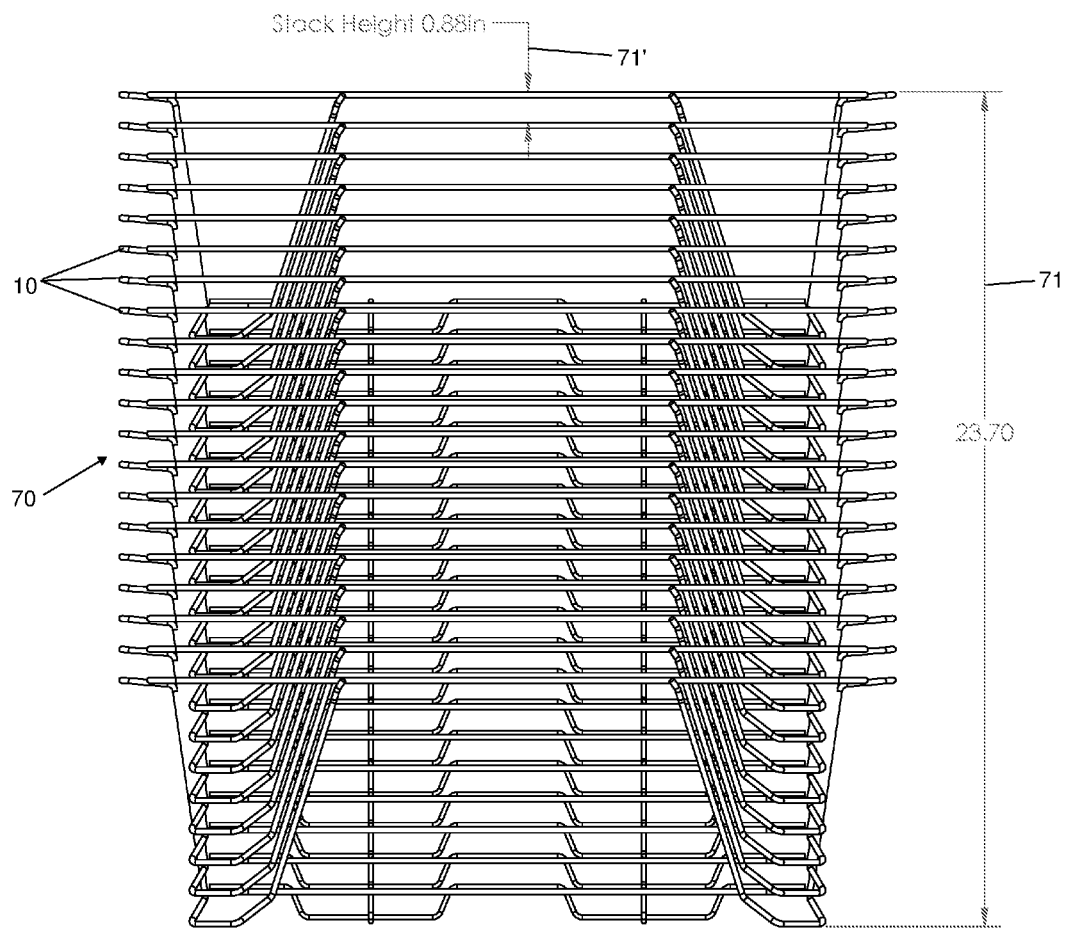
FIG. 6 is a long side view of 20 stacked chafer wire stands of the chafer wire stand of FIG. 1.
Figure 7:
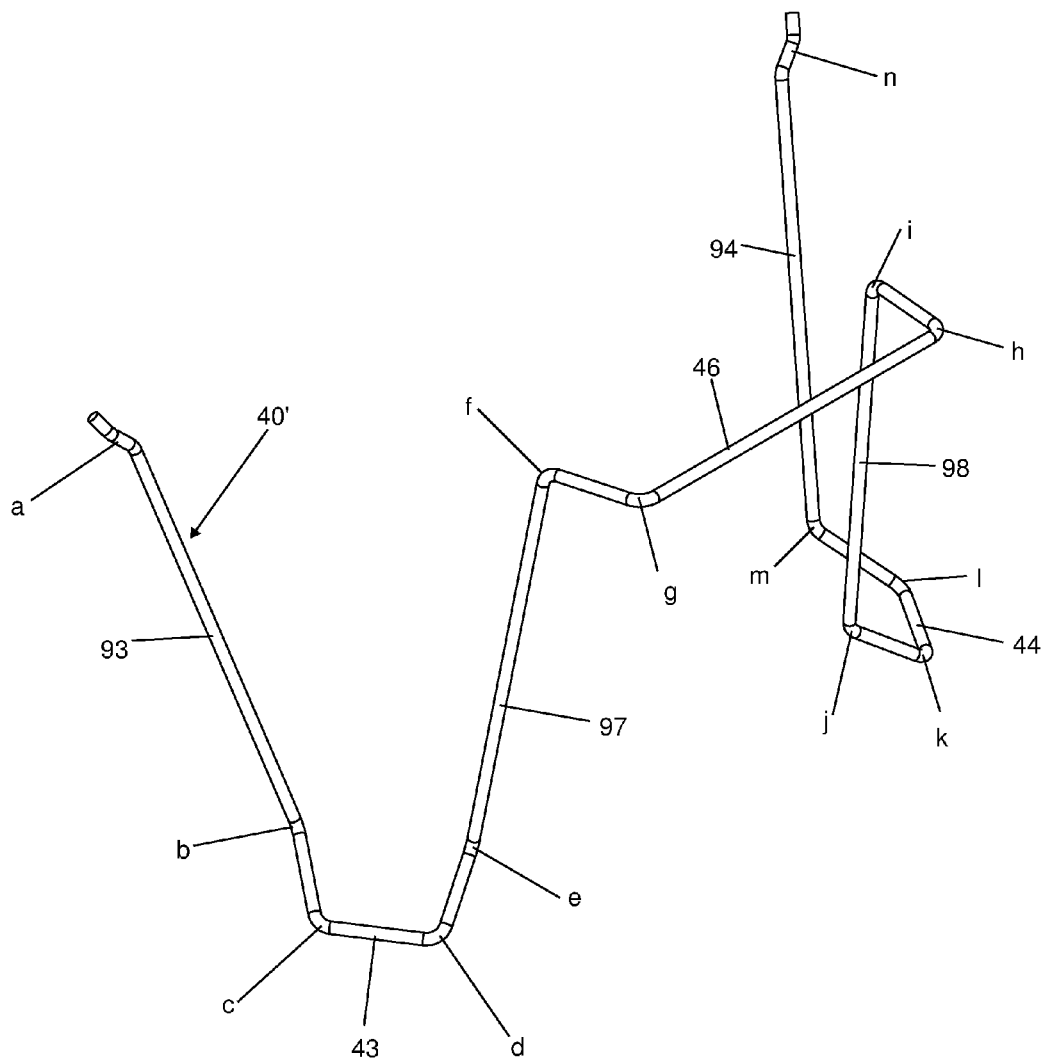
FIG. 7 is a right side perspective view of one of the shaped wires used in the chafer wire stand of FIG. 1 apart from connection with the upper and lower rectangular rims.
Figure 8:
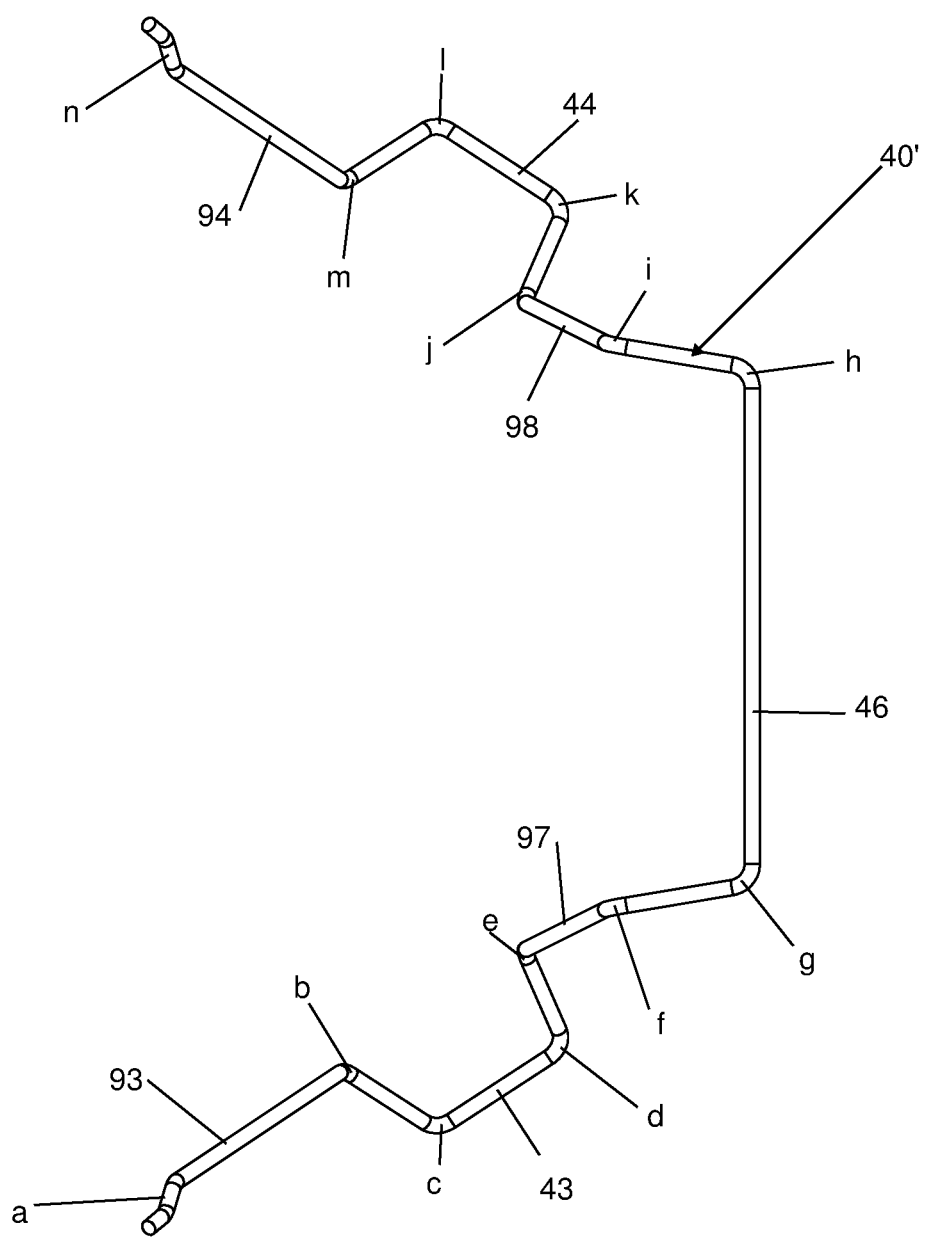
FIG. 8 is a top view of the shaped wire of FIG. 7.
Figure 9:
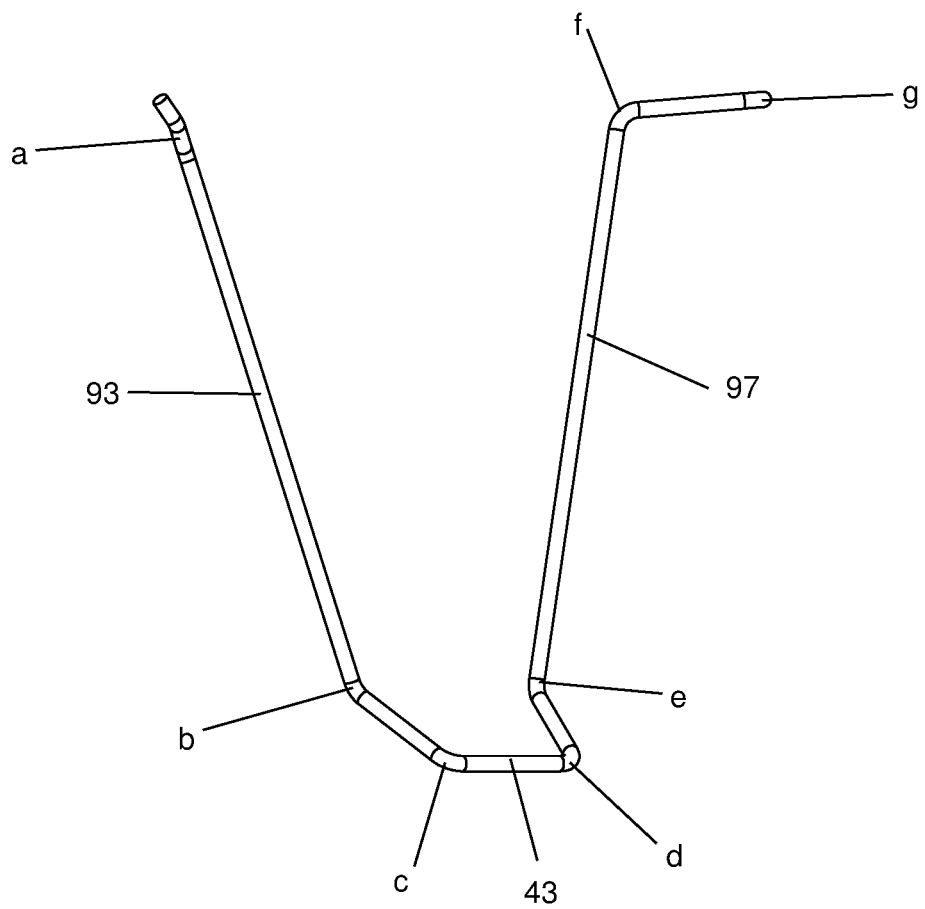
FIG. 9 is a left side view of the shaped wire of FIG. 7.

As shown in FIG. 1 and as more clearly seen in FIGS. 7 and 8, wire 40' (identical with wire 40) embodies fourteen bends (or twists) a-n to provide the respective legs 43 and 44, handle 46 and supporting segment pairs 93, 94 and 97, 98 between the upper and lower rims 20 and 30. As seen in FIGS. 3 and 4 the bent wires 40 and 40' (and the connected upper and lower rims 20 and 30) are symmetrical with respect to vertical axes along the short end of the stand 10 and along the long end of stand 10 such that chafer wire stands 10 can be readily nested as shown in FIG. 6 regardless of end or side orientation.

Figure 5:
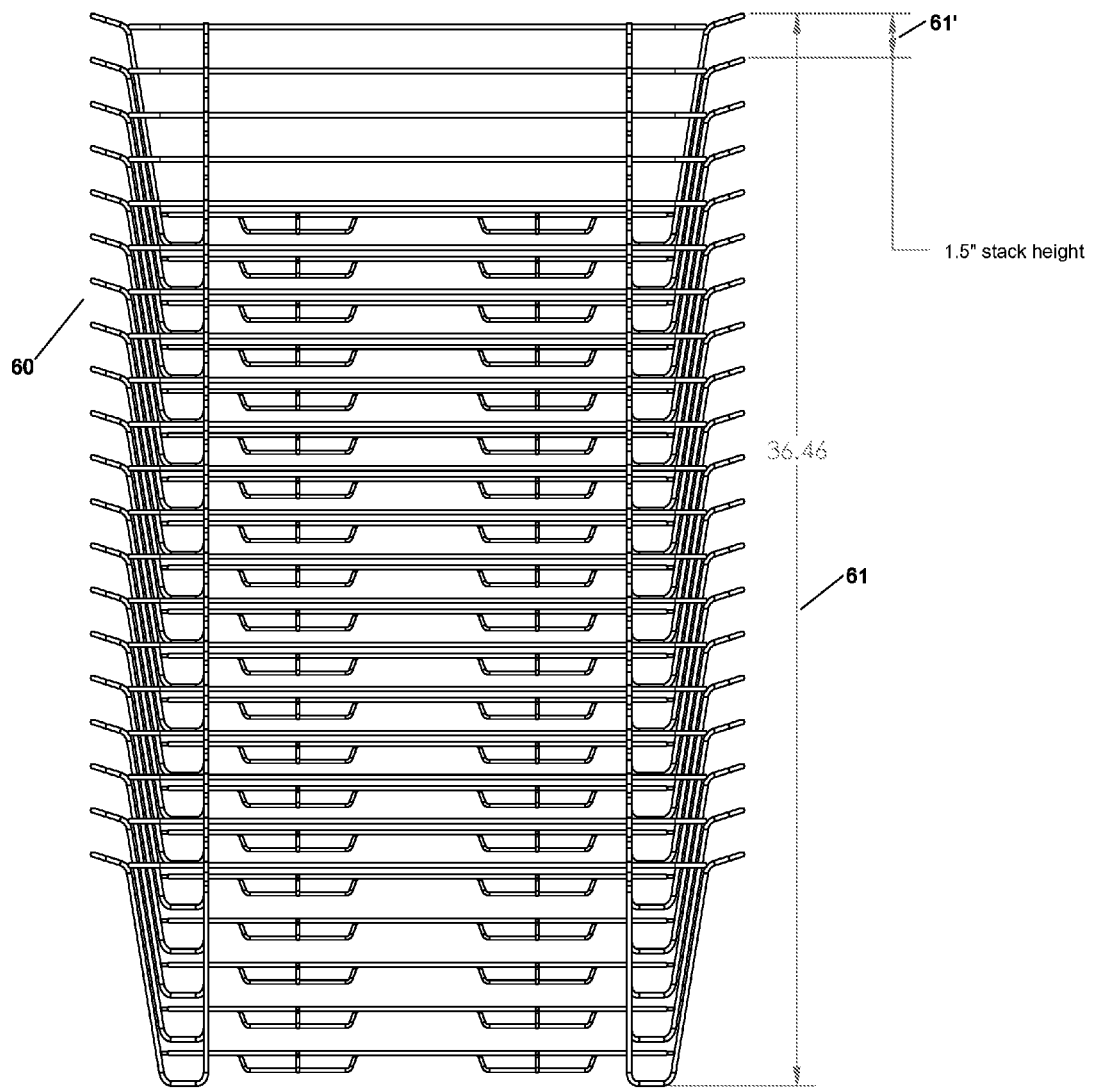
FIG. 5 is a long side view of 20 stacked chafer wire stands of the prior art.

FIG. 5 is a prior art depiction of the stacking of 20 chafer wire stands, as disclosed in the aforementioned patent, into a stack 60. In comparison, the chafer wire stands 10 disclosed herein are shown similarly stacked in FIG. 6 in an identical stack of 20 units. The height of stack 60 is shown as height 61 with an individual stack height of 61'. Present nesting stack 70 has a stack height of 71 which is less than 70% that of prior art stack height 61 and with an individual stack height 71' less than 60% that of individual stack height 61' of the prior art. As is evident from FIG. 6, the various segments and elements of the interior bent wire arrangements of legs, handles, rim separation segments are closely arranged in the stack 70, with the large obtuse bends of the wires providing for readily separable wire stands without wedging.

FIGS. 7 through 10 depict views of the shaped and bent wire 40' of the embodiment described, clearly evidencing the 90° or more of each of the angle bends, which provides the anti-wedging effect when the chafer wire stands are deeply nested. It is appreciated that since wires 40 and 40' are identically shaped, all descriptions of wire 40' are equally applicable to wire 40.

As respectively shown in FIGS. 7 through 10 the shaped and bent wire 40' is unitary, or formed of a single piece of wire, and is shaped and configured to be attached to a side of the vertically adjacent upper and lower rectangular rims 20 and 30 (in FIGS. 1-4). A corresponding, identically shaped wire 40, is configured to be attached to the opposite side of the vertical adjacent upper and lower rectangular rims 20 and 30. Each unitary wire 40, 40' has reflection symmetry, also known as mirror symmetry, on either side of a vertical axis V (shown in FIG. 10) extending through a center of the unitary elongated wire 40' perpendicularly to a horizontal portion of the wire, such as handle 46 of the wire.

Figure 10:
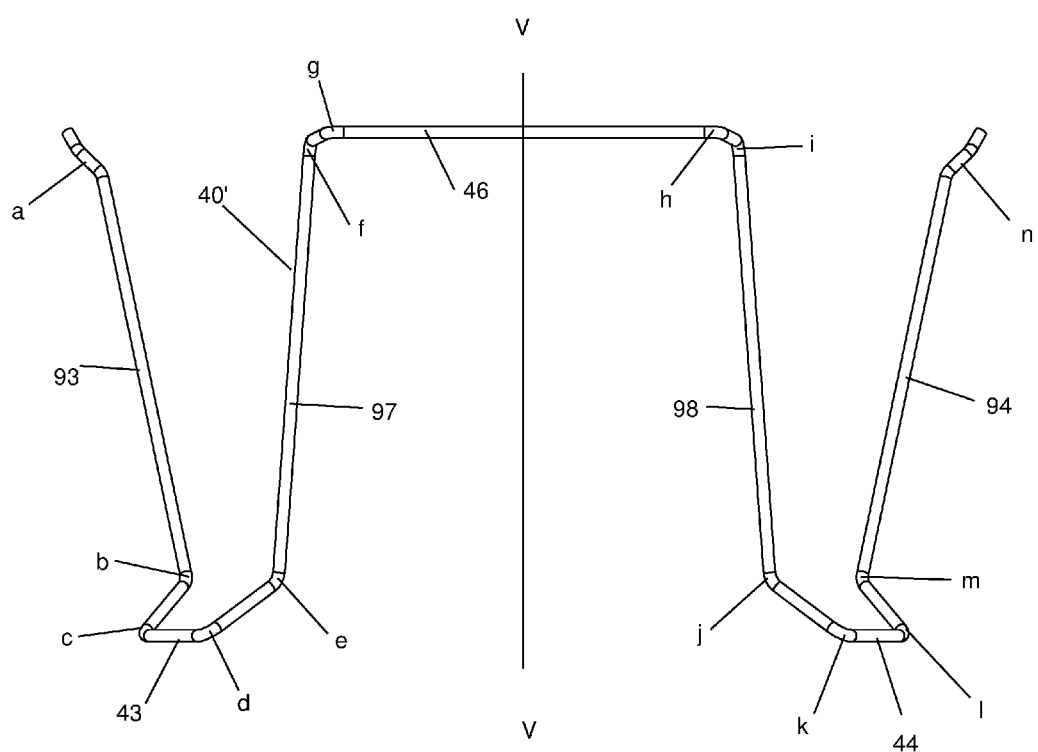
FIG. 10 is a right end view of the shaped wire of FIG. 7.

The wire is symmetrically bent on either side of vertical axis V shown in FIG. 10, by including multiple bends, or twists, labeled a-n along the length thereof. It is a particular feature of the teachings herein that each of the bends a-n only includes obtuse angles of no less than 90°, thereby preventing wedging of the chafer stands when they are nested.

Turning to the specific bends, it is seen that wire 40' includes, to successively form, starting from one end, a short lateral twist "a" which is configured for attachment of wire 40' thereof to a long end side of the upper rim 20. Extending downwardly at an angle therefrom is a first angled long-end side straight wire section 93, extending towards proximal vertically adjacent corner 38 of lower rim 30 for attachment between an end of section 93 and the lower rim 30. A continued off set angular bend "b" out of the plane of the wire provides a first side (b-c) of supporting leg 43. A bend "c" lateral to the first side of supporting leg 43 provides a supporting base c-d for the supporting leg 43.

An upward bend "d" towards a distal side of the vertically adjacent corner 39 defines a second side (d-e) of the supporting leg 43 providing the quadrilateral shape of the leg, and provides for attachment between the second side (d-e) of the supporting leg 43 and lower rim 30. A further bend "e" located adjacent the point of attachment between the second side of the supporting leg 43 and lower rim 30 provides a first angled short-end side straight wire section 97 angled in an upwardly direction away from the supporting leg 43 and from the starting wire end and toward a second, short end side of the upper rim 20, and configured for attachment of section 97 to upper rim 20. A lateral outward bend "f" from the attachment area between section 97 and upper rim 20 forms a first leg (f-g) of handle element 46. The wire is then bent at "g" with a bend configured to be parallel to the second end side 24 of upper rim 20 to form a first half of a gripping part of the handle 46 at the vertical axis V (FIG. 10) and a midpoint and half of the elongated wire 40'.

The symmetrical mirror image formation of the other half of the wire 40' from the wire midpoint at axis V and through bends and twists h-n provides, successively: a second half of the handle 46, a second short-end side straight wire section 98, a second supporting leg 44, and a second long-end side straight wire section 94.

The wires 40 and 40' are identical and symmetrical around the vertical axis V (FIG. 10) and can thus be used on any side of the vertically stacked upper and lower rims 20 and 30, and are closely nestable without wedging, with legs, handles, and angled sections being fitted close to each other as shown in FIG. 6 to provide a stacked structure of minimal size suitable for economical transport and use.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope.

Combinations of any of the methods, systems, and devices described herein above are also contemplated and within the scope of the invention.

I claim:

1. A chafer wire stand comprising:
   a) an upper rim of wire metal which forms a closed geometrical configuration circumscribing a first surface area,
   b) a lower rim of wire metal having a geometric shape substantially identical to said upper rim and circumscribing a second surface area, said second surface area being smaller than said first surface area, and
   c) at least two wires of wire metal substantially identically shaped and bent, such that:
      each of said at least two wires has a segment thereof attached to said upper rim and extending outwardly therefrom to form a handle element for said chafer wire stand; and
      each of said at least two wires being attached to said lower rim and extending downwardly therefrom to form at least one supporting leg for said chafer wire stand;
      wherein each of said at least two wires has at least two straight wire segments thereof extending at an angle between said upper rim and lower rim and connected thereto respectively to thereby hold said upper and lower rim in fixed position relative to each other and wherein each wire is substantially symmetrical relative to a vertical axis through a center thereof
      wherein said at least one supporting leg is bent outwardly and extends out of a plane beyond said second surface area of said lower rim.

2. At least two chafer wire stands of claim 1, wherein a first said chafer wire stand is nested on top of a second said chafer wire stand and at least four respective said segments of said first chafer stand touch at least four corresponding said segments of said second chafer stand in said nested condition.

3. The chafer wire stand of claim 1, wherein said segment of said wire attached to said upper rim to form said handle element is attached to the bottom of said upper rim.

4. The chafer wire stand of claim 1, wherein nesting of multiple chafer wire stands is without wedging between adjacently nested segments.

5. A chafer wire stand comprising:
   a) an upper rim of wire metal which forms a closed geometrical configuration circumscribing a first surface area,
   b) a lower rim of wire metal having a geometric shape substantially identical to said upper rim and circumscribing a second surface area, said second surface area being smaller than said first surface area, and
   c) at least two wires of wire metal substantially identically shaped and bent, such that:
   each of said at least two wires has a segment thereof attached to said upper rim and extending outwardly therefrom to form a handle element for said chafer wire stand; and
   each of said at least two wires being attached to said lower rim and extending downwardly therefrom to form at least one supporting leg for said chafer wire stand;
   wherein each of said at least two wires has at least two straight wire segments thereof extending at an angle between said upper rim and lower rim and connected thereto respectively to thereby hold said upper and lower rim in fixed position relative to each other and wherein each wire is substantially symmetrical relative to a vertical axis through a center thereof; and wherein
   said upper rim and lower rim are each of substantially rectangular configuration having respective short end sides and long end sides;
   each wire comprises at least one straight segment which is attached to and extends between vertically adjacent long end sides of said upper and lower rims; further wherein
   each wire comprises two straight segments which are attached to and extend between vertically adjacent short end sides of said upper and lower rims and further wherein
   said lower rim has four corners;
   each wire has two ends, both ends of each wire being attached to said upper rim on opposite long end sides thereof respectively;
   both ends of said wire having a straight wire segment extending therefrom at an obtuse angle towards a vertically adjacent long end side of said lower rim and being attached thereto at respective positions of said lower rim adjacent to and before a proximal adjacent corner;
   each of said wire end extensions further extending downwardly beyond said proximal corner and being bent and shaped to form respective lower leg support at said adjacent corner;
   respective upwardly bent segments of said wire end extensions being attached to said lower rim at positions beyond said adjacent corner on said short end side of said lower rim;
   said wire ends extensions extending upwardly thereafter to form said straight segments extending between short end sides of said upper and lower rims;
   said respective straight segments being attached to said short end side of said upper rim on symmetrically opposite proximal sides relative to said vertical axis; and
   said wire end extensions extend laterally outwardly beyond said upper rim and meet as a unitary wire at said vertical axis with said formation of said handle; and still further wherein
   each wire comprises fourteen twists and bends with seven twists and bends symmetrically on each side of said vertical axis, with said seven twists and bends comprising:
   i) a first twist proximate to an end of said wire to facilitate attachment of said wire end to said upper rim at a long end side thereof;
   ii) a second bend at a first point of attachment to said lower rim at a long end side thereof;
   iii) third and fourth bends to configure a base of a leg support;
   iv) a fifth bend at an upward point of attachment of said leg support to said lower rim at a short end side thereof;
   v) a sixth bend at a point of attachment to said upper rim at a short end side thereof to form an outwardly extending handle element; and
   vi) a seventh bend as part of said handle element on one side of said vertical axis.

6. A chafer wire stand comprising:
   i. an upper rim of wire metal which forms a geometrical configuration circumscribing a first surface area,
   ii. a lower rim of wire metal having a substantially identical geometrical configuration relative to said upper rim and circumscribing a second area, said second area being smaller than said first area, and
   iii. at least two wires of wire metal substantially identically shaped and bent, such that:
   each wire has a segment thereof attached to said upper rim and extending outwardly therefrom to form a handle element for said chafer wire stand;
   each wire is attached to said lower rim and extending downwardly therefrom to form at least one supporting leg for said chafer wire stand;
   each wire is unitary and has two ends;
   each wire is shaped and attached in pairs thereof to opposite sides of said vertically adjacent upper and lower rims;
   each unitary wire is mirror-image symmetrically bent on opposite sides of a perpendicular vertical axis extending through a center of said unitary elongated wire in a horizontal position extending along a longitudinal length thereof,;
   said wire is symmetrically bent in multiple places along said longitudinal length thereof, with only obtuse angles of no less than 90°, on opposite sides of said vertical axis to successively form, starting from one end:
   a) a short lateral twist attached to a first end side of said upper rim,
   b) a first downwardly extending straight wire section angled towards a proximal vertically adjacent corner of said lower rim, and attaching at an end thereof to said lower rim,
   c) a continued off set angular bend out of a plane of said wire providing a first side of a first supporting leg,
   d) a bend lateral to said first side of said first supporting leg providing a supporting base for said first supporting leg,
   e) an upward bend defining a wire segment extending towards a distal side of said vertically adjacent corner for attachment between an end of said wire segment and said lower rim providing a second side of said first supporting leg, f) a bend providing a first straight wire section angled in a direction away from said corner of said lower rim toward a second end side of said upper rim and attached thereto, g) a lateral outward bend from said attachment of paragraph f forming a first leg of a handle element, and h) a bend parallel to said second end side of said upper rim and forming a first half of a gripping part of said handle at said vertical axis and a midpoint and half of said elongated wire, wherein said symmetrical mirror image formation of another half of said wire provides, successively: a second half of said handle, a second second-end side angled straight wire section, a second supporting leg and a second first-end side angled straight wire section.

7. The chafer wire stand of claim 6, wherein said segment of the wire attached to said upper rim to form the handle element is attached to a bottom of said upper rim.

8. The chafer wire stand of claim 6, wherein said at least one supporting leg is bent outwardly and extends out of a plane beyond said second surface area of the lower rim.

9. The chafer wire stand of claim 6, wherein said first and second downwardly extending straight wire sections, said first and second supporting legs, and said first and second angled section of successively vertically stacked chafer wire stands respectively fit adjacent each other without wedging there-between.

10. A nested stack of at least two chafer wire stands of claim 6:
    wherein said wire stands nest with respective adjacent positioning of said angled segments; and
    wherein said straight segments are angled such that said segments of a first said chafer stand in said nested stack and a second said chafer stand in said nested stack touch each other when nested.

11. The nested stack of at least two chafer wire stands of claim 6, wherein said supporting legs are bent outwardly out of a plane of the lower rim at an angle matched to that of said straight segments when nested.

12. A shaped and configured structurally rigid but bendable unitary elongated wire of wire metal having two ends, said wire being shaped and configured to be attached in pairs thereof to opposite sides of vertically stacked upper and lower rectangular rims of a chafer wire stand, each unitary wire is mirror-image symmetrically bent on opposite sides of a perpendicular vertical axis extending through a center of said unitary elongated wire in a horizontal position extending along a longitudinal length thereof, said unitary elongated wire is symmetrically bent in multiple places along said longitudinal length thereof, with only obtuse angles of no less than 90°, on opposite sides of said vertical axis to successively form, starting from one end:

a. a short lateral twist configured for attachment thereof to a first end side of said upper rim, b. a first downwardly extending straight wire section angled towards a proximal vertically adjacent corner of said lower rectangular rim and attached at an end thereof to said lower rectangular rim, c. a continued off set angular bend out of said plane of said wire to provide a first side of a first supporting leg, d. a bend lateral to said first side of said first supporting leg to provide a supporting base for said first supporting leg, e. an upward bend defining a wire segment extending towards a distal side of said vertically adjacent corner for attachment between an end of said wire segment and said lower rectangular rim to provide a second side of said first supporting leg, f. a bend to provide a first straight wire section angled in a direction away from said corner of said lower rim toward a second end side of said upper rectangular rim attached thereto, g. a lateral outward bend from said attachment of paragraph f to form a first leg of a handle element, and h. a bend parallel to said second end side of said upper rim to form a first half of a gripping part of said handle at said vertical axis and a midpoint and half of said elongated wire, wherein said symmetrical mirror image formation of another half of said wire provides, successively: a second half of said handle, a second second-end side angled straight wire section, a second supporting leg and a second first-end side angled straight wire section.

13. The shaped and configured unitary elongated wire of claim 12, wherein said first and second first-end side straight wire sections, said first and second supporting legs, and said first and second second-end side straight wire sections of successively vertically stacked shaped and configured wires are respectively closely fit adjacent each other without wedging therebetween.

\* \* \* \* \*